No. 612,080. Patented Oct. 11, 1898.
F. D. WILLIAMS.
POTATO PLANTER.
(Application filed July 24, 1896. Renewed May 10, 1898.)
(No Model.)

Witnesses
James F. Duhamel
L. M. Graves

Inventor,
Fred D. Williams.
by John Wedderburn
Attorney

THE NORRIS PETERS CO., PHOTO-LITHO., WASHINGTON, D. C.

UNITED STATES PATENT OFFICE.

FRED D. WILLIAMS, OF COOPERSTOWN, NORTH DAKOTA.

POTATO-PLANTER.

SPECIFICATION forming part of Letters Patent No. 612,080, dated October 11, 1898.

Application filed July 24, 1896. Renewed March 10, 1898. Serial No. 673,402. (No model.)

*To all whom it may concern:*

Be it known that I, FRED D. WILLIAMS, a citizen of the United States, residing at Cooperstown, in the county of Griggs and State of North Dakota, have invented certain new and useful Improvements in Potato-Planters; and I do hereby declare the following to be a full, clear, and exact description of the invention, such as will enable others skilled in the art to which it appertains to make and use the same.

This invention relates to potato-planters.

My object is to provide an improved potato-planter which will more satisfactorily perform its functions; and to this end the invention consists of certain novel features and combinations, as will appear more fully hereinafter.

Figure 1:
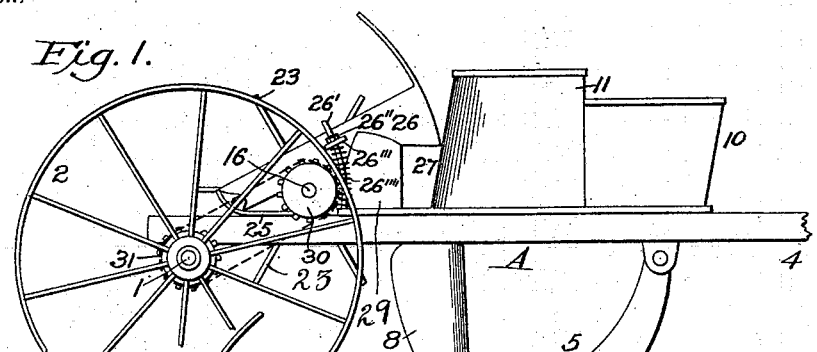
Figure 2:
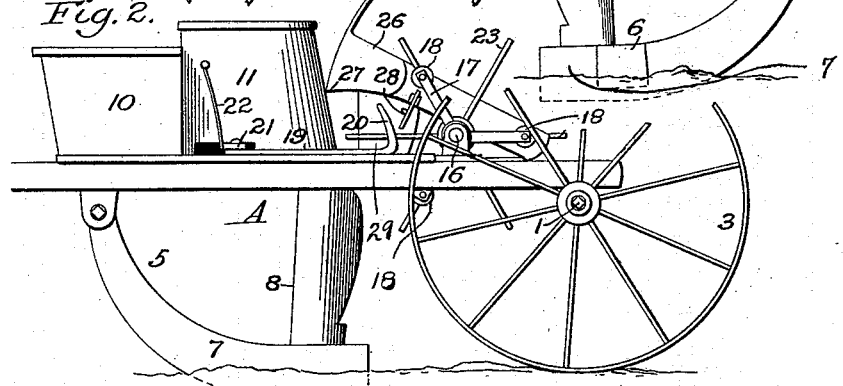
Figure 3:
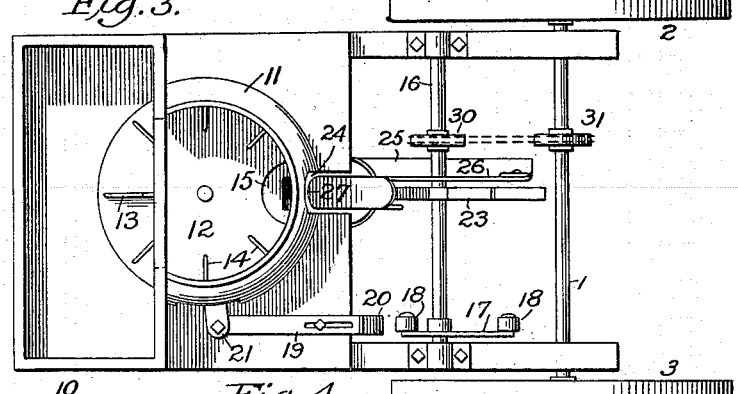
Figure 5:
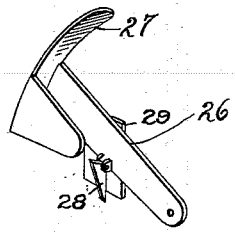
Figure 4:
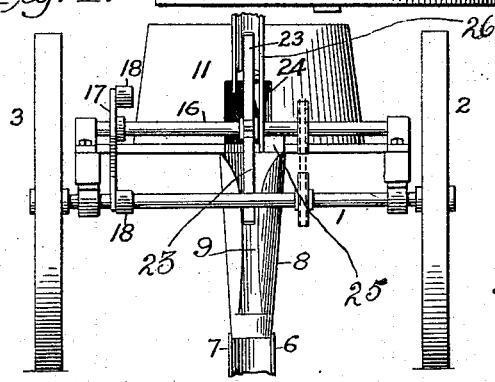

In the accompanying drawings, Figures 1 and 2 are reverse side elevations; Fig. 3, a plan view. Fig. 4 is an end view, and Fig. 5 a detail, of the cutting mechanism.

A designates the frame of the machine, which is carried on a main axle 1, mounted in traction-wheels 2 and 3, and is provided with the usual draft-tongue 4.

The number 5 designates a curved furrow-opening shoe, which, instead of being bifurcated, as usual, is provided with only one flange 6 and a brace 7, which affords connection for a feed-chute 8, open longitudinally, as at 9, and having its receiving-mouth immediately under a feed-opening in the feed-hopper bottom.

A hopper 10 is in communication with the feed-hopper, which is designated by the numeral 11. The feed-hopper is in the form of a frustum of a cone, and a circular feed-disk 12, journaled for rotation therein, acts to feed the potatoes toward the feed-chute. This feed-disk is provided with a rib 13, which serves to draw the potatoes from the main hopper into the feed-hopper, and is also provided with a series of smaller ribs 14, on which the potatoes are caught and fed forward. The feed-opening of the feed-disk is shown at 15.

An auxiliary shaft 16 carries a three-arm cam-wheel 17, which has rollers 18, journaled in the ends of its respective arms.

The numeral 19 designates a slide-bar which has a toe 20, adapted to be struck by the rollers of the cam-wheel. The other end of the bar is pivotally connected to an ear 21 of the feed-disk. A ribbon-spring 22, connected to the hopper, has its free end in engagement with ear 21 and normally presses the slide-bar toward the cam-wheel. The shaft 16 also carries a trip-wheel 23, having arms which move in the slot in the feed-chute and in an opening 24 in the rear of the feed-hopper.

An arm 25 is connected to the frame of the machine immediately in the rear of the feed-hopper, and a second arm 26, pivoted to arm 25, carries a U-shaped cutting-knife 27, which is adapted for movement within the opening 24. The blades of the trip-wheel work in the rear open face of this knife, as shown. A segment 26' is securely connected to arm 25 and passes loosely through pivoted arm 26, being provided with a limit-washer 26''. A U-shaped follower 26''' is connected to arm 26, and a coil-spring 26'''', encircling the segment, is interposed between arm 26 and the follower and keeps the knife normally raised out of the hopper. A dog 28 is pivoted to the arm 25, being adapted to extend transversely thereof. When the tripping-wheel rotates, one of its blades engages with one end of the dog. As the tripping-wheel rotates the knife is drawn down, while the dog rides down and under, allowing the tripping-wheel to disengage and let the knife be retracted by the spring, so that the operation may be repeated.

A sprocket-wheel 30 on the auxiliary shaft, another sprocket-wheel 31 on the main shaft, and a sprocket-chain passing over the two provides the means for driving the mechanism, whose operation will now be described.

As the machine advances the rotation of the auxiliary shaft causes motion to be transmitted through the cam-wheel and slide-bar to impart oscillatory motion to the feed-disk. This forces potatoes from the main hopper into the feed-hopper and advances them to the feed-opening, where they are operated upon by the knife and then descend through the feed-chute to the ground.

Having thus described the invention, what is claimed as new is—

1. In a potato-planter, the combination with a feed-hopper provided with a feed-opening through which the potatoes drop to the ground, of an oscillatory feed-disk for feeding the potatoes to the feed-opening, means for oscillating said disk and a knife for cutting the potatoes at the feed-opening, substantially as described.

2. In a potato-planter, the combination with a feed-hopper provided with a feed-opening through which the potatoes drop to the ground, of an oscillatory feed-disk movable in said hopper and which serves to feed the potatoes to the opening, a slide pivotally connected to the disk, a rotary shaft, a cam-wheel carried thereby which is provided with arms adapted to strike the slide and move the same, and a ribbon-spring pressing against the slide and adapted for moving the disk back to normal position after it has been operated on by the cam-wheel.

3. In a potato-planter, the combination with a feed-hopper provided with a feed-opening through which the potatoes drop to the ground, of an oscillatory feed-disk operating in the hopper, means for imparting oscillating motion to said disk and an intermittently-actuated knife adapted to cut the potatoes as they come over the feed-opening, substantially as described.

4. In a potato-planter, the combination with a feed-hopper provided with a feed-opening, and mechanism for feeding the potatoes to said feed-opening, of cutting mechanism consisting of a pivoted knife, a dog connected to said knife, a cam, a trip-wheel for engaging with the dog thereby causing the latter to ride on the cam and then become disengaged therefrom as the knife is actuated to cut the potatoes, and a spring for returning the knife to its normal position, substantially as described.

In testimony whereof I have signed this specification in the presence of three subscribing witnesses.

FRED D. WILLIAMS.

Witnesses:
  SEVAL FRISWOLD,
  ANDREW STRANDNESS,
  A. H. HANSON.